UNITED STATES PATENT OFFICE 2,150,197

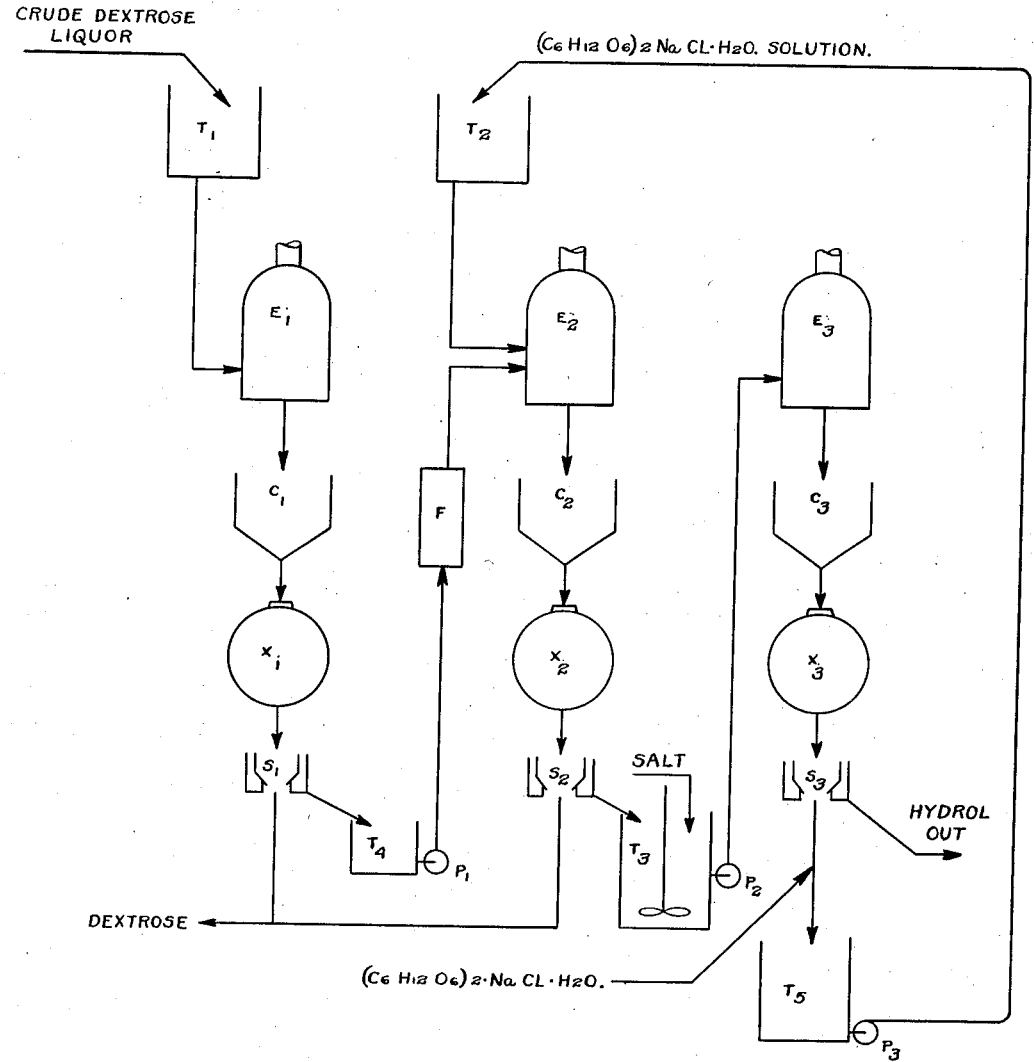

MANUFACTURE OF DEXTROSE

Roscoe C. Wagner and Paul L. Stern, Clinton, Iowa, assignors to Clinton Company, Clinton, Iowa, a corporation of Iowa Application May 13, 1935, Serial No. 21,129
Renewed November 29, 1937

6 Claims. (Cl. 127—46)

This invention relates to the recovery of dextrose from impure solutions containing dextrose, such as solutions obtained from the hydrolytic conversion of starch, corn sugar molasses (hydrol) resulting from the separation of crystallized dextrose from solutions containing the latter, and any and all other dextrose containing liquors no matter whether obtained originally or as intermediate products. It is contemplated that this invention may be utilized in obtaining dextrose from acid and/or enzyme converted starchy and/or carbohydrate material of grains such as rice, wheat, oats, rye, barley, corn or roots such as arrowroot, sago, cassava or tubers such as both white and sweet potatoes, or fruits, vegetables or woody substances capable of yielding dextrose upon hydrolysis, conversion, inversion and/or upon solution in water.

The invention is especially useful in the commercial production of dextrose, commonly referred to as corn sugar, from the concentrated syrup of converted corn starch. According to the usual practice in the industry today, the corn starch is converted until there is produced a solution containing from 87% to 90% of dextrose (dry basis). After the usual clarifying procedure, this solution is concentrated in vacuum pans to such a density as will induce crystallization of the dextrose, either in hydrous or anhydrous form as desired. This invention is concerned with the recovery of dextrose from such starch converted liquors. After the dextrose has been crystallized and removed from the mother liquor by centrifugal separation usually, the filtrate or hydrol remaining contains a large proportion of reducing substances principally dextrose, which is exceedingly difficult to recover from the hydrol. After the removal of the crystals obtained from the first crystallization of dextrose from an original starch converted sugar liquor, this hydrol may contain as much as 70% by weight of the dextrose which was present in the original sugar liquor. Even after repeated crystallizations the hydrol may yet contain sufficient dextrose in solution to make further recovery desirable.

By means of processes comprising the present invention, as high as 60% of the total dextrose contained in the original sugar liquor may with ease be recovered economically. Part of the dextrose is obtained from the original dextrose liquor and the remainder is recovered by treating the hydrol from the first crystallization of the original liquor in the manner herein set forth. By careful manipulation in accordance with the description of this invention, even 80% or more of the original dextrose may be recovered, if desired.

The primary object of the invention, therefore, is to provide a process for the recovery of dextrose from impure dextrose containing liquors which will yield economically a greater recovery of the dextrose from such liquors than has heretofore been customary.

Various other objects and advantages of the invention will be set forth hereinafter.

The invention may be best illustrated by describing its application to the recovery of dextrose from the well known dextrose containing liquids which are produced by converting corn starch by means of heat and acid into dextrose and other starch conversion products, as is done for the purpose of producing refined corn sugar, corn syrup, etc. The attached drawing illustrates diagammatically the prefered form of the process as applied to the corn starch conversion liquors.

Reference may be had to the United States Letters Patent No. 1,886,941 of George E. Corson and Arthur P. Bryant, issued November 28, 1932, for a general understanding of the starch conversion liquors referred to herein.

In our invention herein described advantage is taken of the well known fact that dextrose forms double salt with several halogen salts. One of these double salts, dextrose sodium chloride, having the formula $(C_6H_{12}O_6)_2.NaCl.H_2O$ is obtained by allowing a mixture of concentrated solutions of two mols of dextrose and one mol of sodium chloride to crystallize together as was disclosed by V. Lippman in "Die Zuckerarten and Ihre Derivate" 1882, pp. 44-45. See also the discussion by Shinnosuke Matsuura in the Bulletin of the Chemical Society of Japan, 2, 44 (1927) in an article entitled "Equilibrium of the system: Dextrose-sodium chloride-water." As can be seen from the above formula 58.5 parts by weight of sodium chloride would combine with 360 parts by weight of dextrose, making the ratio of 16.2 parts of sodium chloride to each 100 parts of dextrose.

Referring now to the drawing, a crude dextrose liquor produced by converting corn starch into dextrose and other starch conversion products and subjected to the filtration procedures commonly practiced and well known in the industry, is typical of the crude dextrose liquor intended to be fed into tank TI. This liquor, as required, is discharged into an evaporator EI, preferably of the vacuum type, where it is reduced in the evaporator to a density which may range from 37° to 43° Bé., the preferred density being about 40° Bé. The concentrated liquor will then be delivered into the cooler CI and cooled rapidly to a range of 110° to 100° F. Within this range, at the preferred density, conditions are favorable to the crystallization of hydrous dextrose crystals in preference to the anhydrous form. The cooled concentrated liquor is then discharged into a crystallizer XI provided with agitating means and the temperature therein is further reduced gradually down to about 95° F. as the crystal growth proceeds. Slow continuous or intermittent agitation may be given to the crystallizing mass to prevent formation of large agglomerations of crystals such as might interfere with uniform crystallization of the large hydrate crystals that are desired. The use of dextrose crystals as seed in the crystallizer is recommended, the amount of seed to be used being a matter of individual judgment.

When crystallization has proceeded far enough to produce a magma which will centrifuge efficiently the magma is conducted to the centrifugal separator S1 and there the crystallized dextrose is separated centrifugally from the hydrol. The dextrose thus produced will, after suitable washing in the centrifugal, be found to have a purity in excess of 99%, to be perfectly white and have a good luster. Substantially all of it will be of the hydrous form and may be dried and pulverized and prepared for the market as refined dextrose.

The hydrol and washings from the centrifugal S1 will be collected in the tank T4. If desired, this liquor may be concentrated again in an evaporator such as E1, cooled and run through the crystallizer X1 and centrifugal S1 in order to procure another yield of pure dextrose therefrom. However, instead of subjecting this hydrol and washings to a recrystallization process similar to the original crystallization process, it will usually be preferable to pump the hydrol and washings from the tank T4 by means of pump P1 into another evaporator E2. If desired, this liquor may be caused to pass through a bone char or a vegetable carbon filter F on its way to the evaporator E2, but filtration at this stage is not necessary. In the evaporator E2 the hydrol and washings are mixed with a solution of dextrose sodium chloride, this double salt being dissolved in water either in the tank T2 or previously in the tank T5. In the contemplated commercial operation of the process, this dextrose sodium chloride solution will be produced in the process in the manner hereinafter described and as indicated in the drawing, but for initiating the process when none of the double salt is at hand, a solution of the necessary double salt may readily be made by combining about 16 parts of sodium chloride (NaCl) with about 100 parts of dextrose having the formula $C_6H_{12}O_6$ and dissolving the mixture in enough water to assure complete solution of the two. In this water solution of the sugar and salt the double salt, dextrose sodium chloride, having the formula

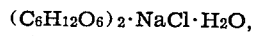
$$(C_6H_{12}O_6)_2 \cdot NaCl \cdot H_2O,$$

will not exist as such, although if the solution here described were concentrated and crystallized, then the crystalline product would be the double salt.

Whether the double salt solution stored in the tank T2 be received from the process as hereinafter described or be especially prepared as just stated, the amount of it which is to be introduced into the evaporator E2 for mixing with the hydrol and washings from tank T4 should not be in such excessive proportion that dextrose sodium chloride will crystallize from the solution when it is subsequently evaporated and crystallized under the normal conditions hereinafter described. We have found that the amount of the double salt which may be added in the evaporator E2 should not exceed a weight (calculated on dry basis) approximately equal to the weight of the dextrose supplied from the tank T4 (also calculated on a dry basis). Within these proportions the evaporation and crystallization process carried out in E2, C2 and X2 will produce only pure dextrose, which in this instance, is the preferred result.

Assuming that the proper proportions of the solutions are present in the evaporator E2 in accordance with the above determinations, the evaporation will proceed until the liquor is concentrated to a density ranging from 37° to 43° Bé. but preferably at about 40° Bé. This concentrated liquor will then be conducted into the cooler C2 and rapidly cooled down to a temperature range of about 110° to 100° F., at which temperature range conditions are favorable for the crystallization of hydrous dextrose crystals in preference to the anhydrous dextrose crystals. The cooled concentrated liquor is then discharged into a crystallizer X2 provided with agitating means and the temperature therein is further gradually reduced down to about 95° F. as the crystal growth proceeds. It will be understood that the temperatures herein mentioned are subject to some variation as will be appreciated by those skilled in this art, the indicated temperatures being those which will normally give the best results. Slow continuous or intermittent agitation may be imparted to the crystallizing mass to prevent formation of large agglomerations of crystals such as might interfere with uniform crystallization of the large hydrate crystals which are here desired. The use of seed in the crystallizer is recommended in accordance with the usual practice, and as customary, this seed may be crystals left over from a previous batch or dextrose crystals introduced for that particular purpose, the amount of the seed to be used being a matter for the exercise of individual judgment.

When the crystallization of the magma in X2 has proceeded far enough to produce a magma which will centrifuge efficiently, it will be discharged into the centrifugal separator S2. The hydrol and washings will be discharged into the tank T3 while the washed crystals, which in this case will be pure dextrose, will be diverted elsewhere, dried, pulverized and prepared for the market as refined dextrose. The dextrose discharged from the centrifugal or spinner S2 will have as high purity as that discharged from the centrifugal S1 and will be perfectly white and have a good luster. Substantially all of the crystals will be of the hydrous form. While a small amount of sodium chloride may be found present in the crystals discharged from S2, the amount will be less than .05% which is about the same as that contained in the better grades of dextrose produced by other well known processes.

The hydrol and washings delivered into the tank T3 should be analyzed for their sodium chloride and extrose content and if necessary salt (NaCl) will be added to the tank T3 in whatever amount is necessary to provide 16 parts of salt to 100 parts of reducing sugars calculated as dextrose. The solution in the tank T3 should be thoroughly mixed and delivered as required into the evaporator E3.

It is contemplated that evaporation, crystallization and separation carried out in the evaporator E3, cooler C3, crystallizer X3 and centrifugal separator S3 will be performed under substantially the same conditions as to density, temperature, etc. as have been described heretofore for the operation of the other crystallization steps in this invention. Hence these conditions need not now be recited in full. The object, however, of this phase of this process is different, it being contemplated, as will be readily perceived, that the crystals discharged from the centrifugal S3 will be the double salt having the formula $$(C_6H_{12}O_6)_2.NaCl.H_2O$$

The crystal cake in the centrifugal S3 may be washed or not, as desired, the cake itself being dropped into the tank T5, dissolved in water and pumped up into the tank T2 where it is used in the evaporator E2 in the manner heretofore described, this being the dextrose sodium chloride solution which was heretofore referred to as that which the process will produce normally. The hydrol discharged from the centrifugal S3 may, with or without the washings, be used for the production of further amounts of the double salt, by adding more salt to it and adjusting the 16 to 100 ratio heretofore mentioned and subjecting it to evaporation and crystallization for the production of the double salt. However, it may in many cases be found more economical to use this hydrol, with or without the washings, for addition to cattle feed, preferably in a concentrated state, as its ingredients have considerable food value.

In the process described in this invention it will be perceived that two phases of the process produce pure dextrose, and that one of these phases produces a hydrol which is unmixed with salt. As occasion demands in the industry, it may be of advantage at times to have the process yielding a hydrol free from salt so that some of this hydrol may be used perhaps in the production of 70 sugar or 80 sugar, in accordance with well known practices in this industry.

It should be understood that certain details of the manipulation of the crystallization processes do not differ from the common practice of crystallization of dextrose from starch conversion solutions, as will readily be appreciated by those who are skilled in this art. Hence such details do not require elaboration or specific mention in this specification. Such steps as involve a departure from customary practices are herein mentioned.

It will be further understood that the process herein described as forming this invention is subject to some variation, within reasonable limits, and it is contemplated that it may be so varied without a departure from the spirit and scope of the invention defined in the appended claims.

Having shown and described our invention, we claim:

1. A method of obtaining dextrose from an impure dextrose-containing hydrol comprising dissolving dextrose sodium chloride in said hydrol in proportions calculated to permit crystallization of dextrose only therefrom, subsequently crystallizing and separating dextrose from said hydrol, adding sodium chloride to the resulting hydrol proportioned to afford a yield of crystallized dextrose sodium chloride therefrom, effecting separation and crystallization of dextrose sodium chloride from said hydrol, and utilizing the crystallized double salt in a solution for admixture with fresh quantities of the first said hydrol for crystallizing dextrose therefrom.

2. In the manufacture of dextrose from impure dextrose-containing liquors, the improvement involving the recovery of additional dextrose from a hydrol remaining from such liquors from which dextrose has been crystallized and removed, consisting in adding dextrose sodium chloride to said hydrol in a substantial amount but not exceeding the weight of the dextrose already present in said hydrol to yield dextrose only upon subsequent crystallization and separation, and crystallizing and separating a yield of dextrose.

3. In the manufacture of dextrose from impure dextrose-containing liquors, the improvement involving the recovery of additional dextrose from a hydrol remaining from such liquors from which dextrose has been crystallized and removed, consisting in adding dextrose sodium chloride to said hydrol to yield dextrose only upon subsequent crystallization and separation, separating the dextrose thus produced, and adding salt to the liquor remaining after the last said separation of dextrose for producing from such newly formed mixture by concentration and crystallization a batch of dextrose sodium chloride.

4. In the manufacture of dextrose from impure dextrose-containing starch conversion liquors from which some dextrose has been crystallized and removed, a process which includes increasing the proportion of crystallizable dextrose relatively to uncrystallizable substances in such liquor by adding thereto a solution of dextrose sodium chloride but in such proportions that the weight of double salt added does not exceed the weight of dextrose already present whereby dextrose only will readily crystallize from the resultant mixture at densities between 37° and 43° Bé. at temperatures of about 100° F., and crystallizing and separating dextrose from the mixture.

5. In the manufacture of dextrose from dextrose containing starch conversion liquors, the process which consists in subjecting the liquor and its derivatives to three separate crystallizations for removal of the dextrose content thereof comprising crystallizing and removing part of the dextrose directly from the original liquor, adding to the first hydrol a solution of dextrose sodium chloride produced in the process from previous batches of the liquor, the weight of dextrose sodium chloride so added being not greater than the weight of the dextrose already in the hydrol whereby pure dextrose is crystallized from said mixture, crystallizing and separating a yield of dextrose from said mixture adding to the second hydrol thereafter remaining sodium chloride in such proportion that crystallization of said mixture will produce a yield of dextrose sodium chloride, and utilizing the dextrose sodium chloride thus produced for addition to first hydrols produced in the process from succeeding batches of original liquor.

6. In the manufacture of dextrose from dextrose-containing liquors, the method consisting of subjecting the liquor to evaporation and crystallizing a yield of dextrose and separating the same from the liquor, adding to the hydrol then remaining an aqueous solution of dextrose sodium chloride in such amount as to materially increase the dextrose content of the combined mixture but not in such an amount that the dextrose and sodium chloride thus added exceed the weight of the dextrose previously present, subjecting said mixture to crystallizing conditions favorable to the production of hydrous dextrose, and separating the crystals thus produced.

ROSCOE C. WAGNER.
PAUL L. STERN.